United States Patent
Takagi

(10) Patent No.: US 9,787,898 B2
(45) Date of Patent: Oct. 10, 2017

(54) APPARATUS, METHOD AND STORAGE MEDIUM STORING COMPUTER PROGRAM PRODUCT FOR CONTROLLING IMAGING

(71) Applicant: CANON KABUSHIKI KAISHA, Tokyo (JP)

(72) Inventor: Yosuke Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/079,405

(22) Filed: Mar. 24, 2016

(65) Prior Publication Data

US 2016/0286125 A1 Sep. 29, 2016

(30) Foreign Application Priority Data

Mar. 27, 2015 (JP) .................. 2015-066822

(51) Int. Cl.
| | |
|---|---|
| *H04N 5/232* | (2006.01) |
| *H04N 5/225* | (2006.01) |
| *H04N 21/241* | (2011.01) |
| *G06F 9/44* | (2006.01) |

(52) U.S. Cl.
CPC .............................. *H04N 5/23245* (2013.01)

(58) Field of Classification Search
CPC ........... H04N 5/23245; H04N 5/23241; H04N 5/23209; H04N 5/23225; H04N 5/2254; H04N 2201/0046; H04N 2201/0034; H04N 21/241; G06F 9/00; G06F 9/4408; G06F 9/441; G05B 2213/2205
USPC ....... 348/372, 333.02, 333.01, 333.11; 713/2
See application file for complete search history.

(56) References Cited

U.S. PATENT DOCUMENTS

| | | | | |
|---|---|---|---|---|
| 2008/0040599 A1* | 2/2008 | Yoshida | ................ | G06F 9/4405 713/2 |
| 2008/0186194 A1* | 8/2008 | Kaminski | .............. | G08B 21/00 340/683 |
| 2009/0111517 A1* | 4/2009 | Chen | ................. | H04M 1/72522 455/556.2 |
| 2010/0185842 A1* | 7/2010 | Yu | ....................... | G06F 11/1417 713/2 |
| 2012/0297177 A1* | 11/2012 | Ghosh | ..................... | G06F 21/53 713/2 |
| 2014/0191994 A1* | 7/2014 | Chung | .................. | G06F 3/0488 345/173 |
| 2014/0207924 A1* | 7/2014 | Roper | ...................... | G06F 9/54 709/221 |

(Continued)

FOREIGN PATENT DOCUMENTS

JP 2012-146052 A 8/2012

*Primary Examiner* — Tuan Ho
*Assistant Examiner* — Marly Camargo
(74) *Attorney, Agent, or Firm* — Cowan, Liebowitz & Latman, P.C.

(57) ABSTRACT

On an imaging apparatus according to the present invention, a first operating system (OS) is initially activated, and thereafter a second operating system (OS) is activated. When the second OS is activated, in an event that a first camera function of the first OS is performing imaging preparation, the imaging apparatus according to the present invention executes imaging processing using the first camera function. In an event that the first camera function is not performing imaging preparation, the imaging apparatus activates a second camera function of the second OS.

6 Claims, 5 Drawing Sheets

(56) References Cited

U.S. PATENT DOCUMENTS

| | | | | |
|---|---|---|---|---|
| 2014/0223158 A1* | 8/2014 | Zhou | ................. | G06F 9/4405 713/2 |
| 2015/0277929 A1* | 10/2015 | Paul | ................. | G06F 9/441 713/2 |
| 2016/0119538 A1* | 4/2016 | Kim | ................. | H04N 5/232 348/360 |

* cited by examiner

APPARATUS, METHOD AND STORAGE MEDIUM STORING COMPUTER PROGRAM PRODUCT FOR CONTROLLING IMAGING

BACKGROUND OF THE INVENTION

Field of the Invention

The present invention relates to an apparatus, a method, and a storage medium storing computer program product for controlling imaging by using a plurality of operating systems (OS).

Description of the Related Art

Conventionally, there has been a digital camera that includes a real-time operating system (hereinafter, referred to as an RTOS) and a general-purpose operating system (hereinafter, referred to as a general-purpose OS). The RTOS has a function of controlling a task to execute and includes a function and property for executing processing with time constraints. For this reason, the RTOS is an operating system suitable for real-time processing. Meanwhile, the general-purpose OS such as Android (registered trademark) has more functions compared with the RTOS, although the general-purpose OS takes time to complete activation after power to a digital camera has been turned on. With this configuration, in a case where the digital camera operates exclusively on the general-purpose OS, a problem would occur when a user attempts to capture an image immediately after the power to the digital camera has been turned on. In some cases, it is difficult for the user to capture an image in a timing desirable for the user because the general-purpose OS has not been activated in time.

An electronic device described in Japanese Patent Application Laid-Open No. 2012-146052 allows a camera function operating on the RTOS to be activated immediately after the power to the camera has been turned on, and thereafter, starts activation processing of the general-purpose OS in a background. In a case where the electronic device detects an imaging instruction during a period until completion of the activation processing of the general-purpose OS, the electronic device stops the activation processing of the general-purpose OS. Subsequently, this electronic device uses the RTOS to control the camera function so as to execute imaging processing. After executing imaging by the RTOS, the electronic device restarts activation processing of the general-purpose OS.

In the electronic device disclosed in Japanese Patent Application Laid-Open No. 2012-146052, however, an imaging instruction has not been generated at a time when the electronic device is using the RTOS to control the camera function and performing framing operation and zooming operation in response to a user's instruction, and thus, the activation processing of the general-purpose OS is continuing without interruption. With this configuration, in a case where the activation processing of the general-purpose OS is completed while the user is performing imaging preparation operation using the camera function of the RTOS, the camera function is switched to the camera function operating on the general-purpose OS causing the setting on the RTOS to be cancelled. This might lead to an interference with the user's imaging operation. In short, imaging processing in a case where imaging operation is performed immediately after the power has been turned on can be a problem.

SUMMARY OF THE INVENTION

An object of the present invention is to provide an imaging apparatus capable of executing imaging processing without interfering with user's imaging operation even immediately after the power has been turned on and capable of promptly activating the general-purpose OS.

An imaging apparatus according to the present invention includes a plurality of operating systems and executing imaging processing according to a camera function that operates on each of the plurality of operating systems, and the imaging apparatus includes: a reception unit configured to receive input of an operation signal of imaging preparation according to a first camera function of a first operating system, activation of the first operating system being completed prior to activation of a second operating system; and a control unit configured to execute a second camera function of the second operating system instead of the first camera function in an event that the first camera function is not executing imaging preparation processing when activation of the second operating system is completed, and continue execution of the first camera function without starting execution of the second camera function in an event that the first camera function is executing imaging preparation processing when the activation of the second operating system is completed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
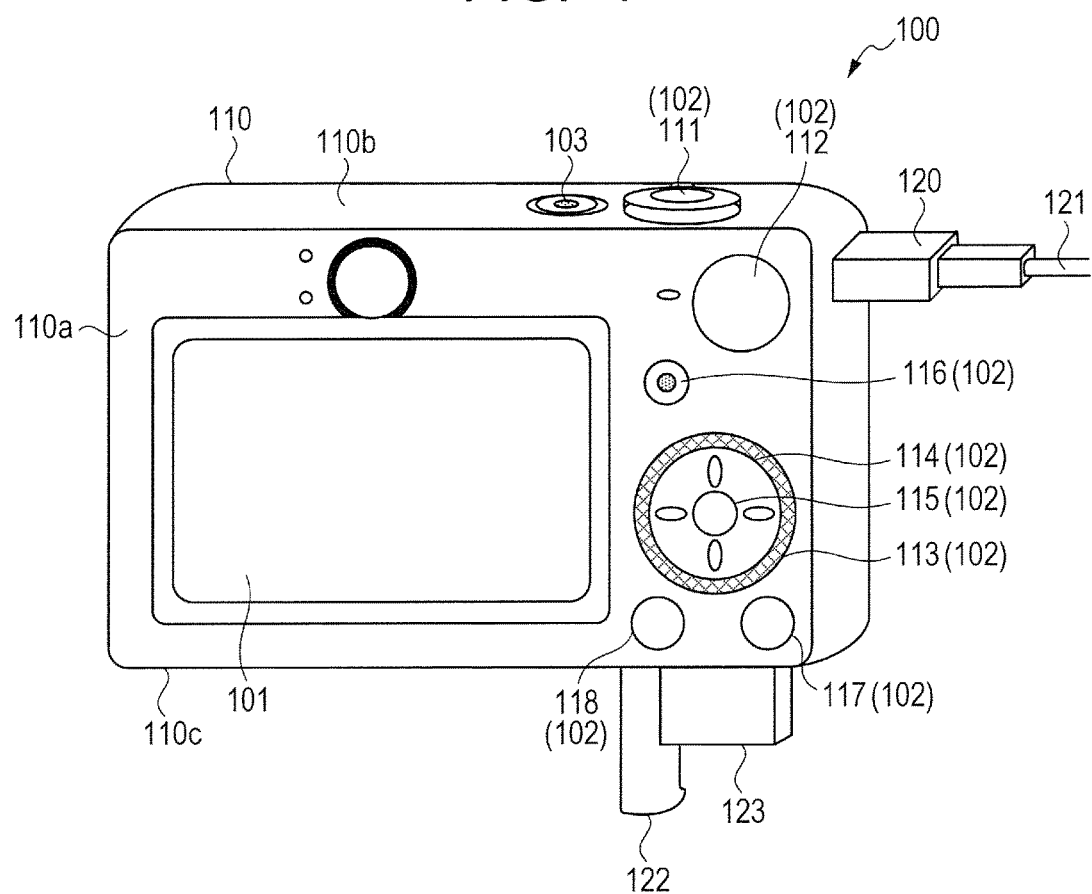
FIG. 1 is an exemplary external view of an imaging apparatus according to a first embodiment of the present invention.

Hereinafter, a first embodiment of the present invention will be described with reference to the drawings. FIG. 1 is an exemplary external view of a digital camera 100 that serves as an imaging apparatus according to the first embodiment of the present invention. The digital camera 100 includes a display unit 101, an operation unit 102, and a power switch 103. On the digital camera 100, a side on which the display unit 101 is provided is defined as a back surface side, and a side on which the power switch 103 is provided is defined as an upper side.

The display unit 101 is provided on a back surface 110a of a housing 110 of the digital camera 100 and displays an image and a variety of information. The operation unit 102 includes a shutter button 111, a mode selection switch 112, a controller wheel 113, a four-way button 114, a determination button 115, and buttons 116 to 118, and receives various types of operation from a user. The configuration may be such that the operation unit 102 is a touch panel including a position input function at the display unit 101 and that coordinate information that corresponds to a touched position is output.

The shutter button 111 is provided on an upper surface 110b of the housing 110 and performs imaging instruction. The mode selection switch 112 is provided on the back surface 110a of the housing 110 and switches various modes related to imaging. The controller wheel 113 is provided on the back surface 110a of the housing 110 and rotatably arranged. The four-way button 114 can be operated in four directions of up, down, left, and right. A selected item is changed by operation of the four-way button 114. The selected item is determined by the determination button 115. The buttons 116 to 118 are provided on the back surface 110a of the housing 110 and receive various types of operation.

The power switch 103 is a button used for switching power on/off of the digital camera 100. The digital camera 100 includes a terminal (not illustrated) for connecting a connector 120 on a side surface of the housing 110. By connecting the connector 120 to the terminal, the digital camera 100 communicates with external devices via a connection cable 121. The digital camera 100 includes, on a lower surface 110c of the housing 110, a storage medium slot (not illustrated) and a lid portion 122, and houses a storage medium 123 such as a memory card in the storage medium slot. The storage medium 123 housed in the storage medium slot can communicate with the digital camera 100. The lid portion 122 covers an insertion port of the storage medium slot.

Figure 2:
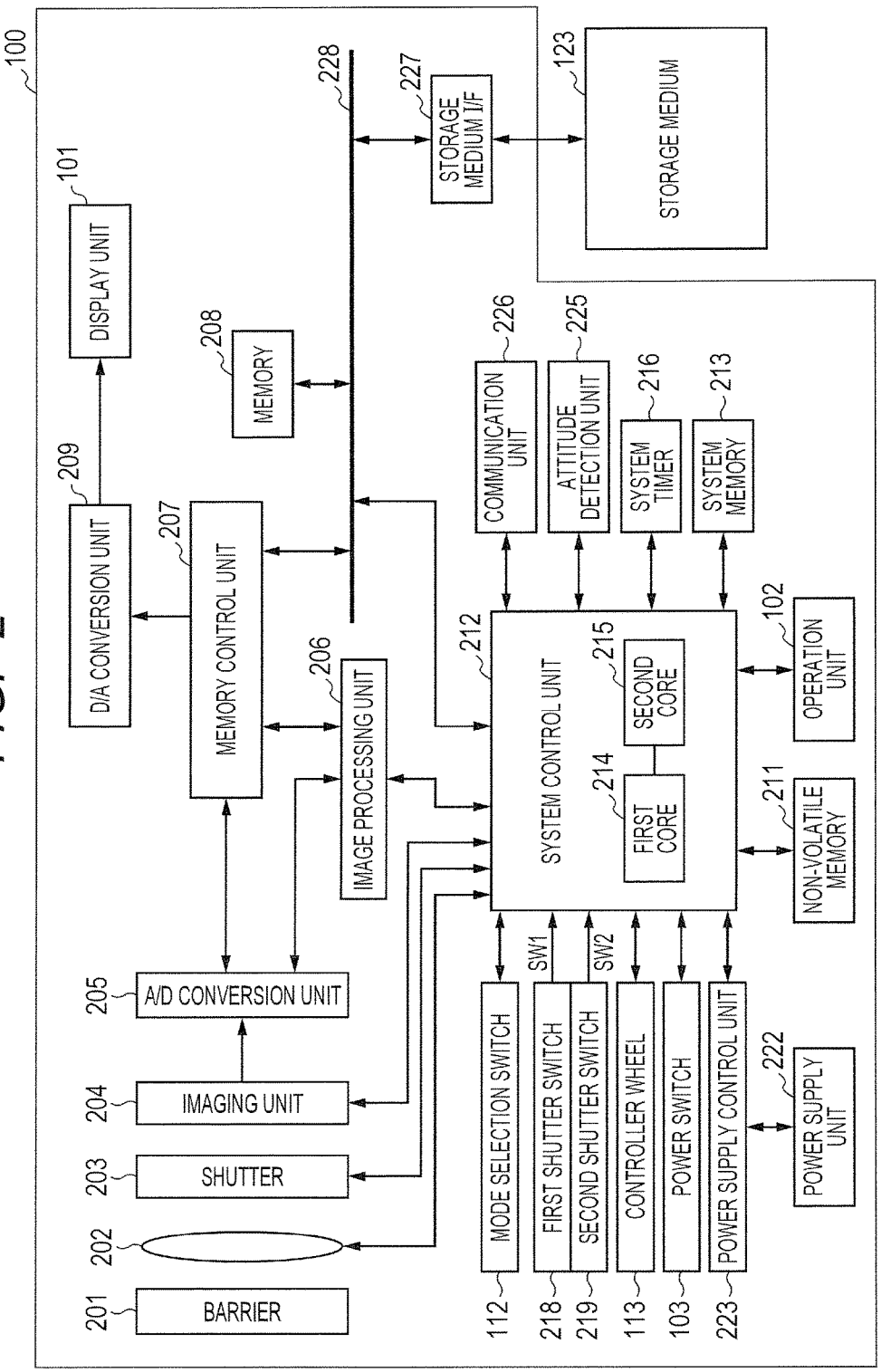
FIG. 2 is a block diagram illustrating a configuration of the imaging apparatus according to the first embodiment of the present invention.

FIG. 2 is a block diagram illustrating a configuration of the digital camera 100 according to the present embodiment. The digital camera 100 has a camera function and includes a barrier 201, an imaging lens 202, a shutter 203, an imaging unit 204, an A/D conversion unit 205, an image processing unit 206, a memory control unit 207, a memory 208, a D/A conversion unit 209, and non-volatile memory 211. The digital camera 100 further includes a system control unit 212, a system memory 213, a system timer 216, the mode selection switch 112, a first shutter switch 218, and a second shutter switch 219. The digital camera 100 further includes a power supply unit 222, a power supply control unit 223, an attitude detection unit 225, a communication unit 226, a storage medium I/F 227, and a memory bus 228.

Each of the imaging lens 202, the shutter 203, the imaging unit 204, the image processing unit 206, the non-volatile memory 211, the system memory 213, the system timer 216, and the mode selection switch 112 is electrically connected with the system control unit 212. Each of the first shutter switch 218, the second shutter switch 219, the controller wheel 113, the operation unit 102, the power supply control unit 223, the power switch 103, the attitude detection unit 225, and the communication unit 226 is also electrically connected with the system control unit 212.

The barrier 201 covers an imaging system of the digital camera 100 including the imaging lens 202 so as to prevent contamination and breakage of the imaging system including the imaging lens 202, the shutter 203, and the imaging unit 204. The imaging lens 202 is a lens group including a zoom lens and a focus lens. The shutter 203 has an aperture function of controlling the amount of light. The imaging unit 204 is an imaging device including a CCD device, a CMOS device, or the like, that converts an optical image into an electric signal. The A/D conversion unit 205 converts an analog signal that is output from the imaging unit 204 into a digital signal.

The image processing unit 206 executes predetermined resize processing and color conversion processing including pixel interpolation and reduction on data transmitted from the A/D conversion unit 205 or data transmitted from the memory control unit 207. The image processing unit 206 executes predetermined calculation processing by using captured image data. Based on an obtained result of calculation, the system control unit 212 performs exposure control and ranging control. With this configuration, auto focus (AF) processing of a through-the-lens (TTL) system, automatic exposure (AE) processing, and flash pre-emission (EF) processing are executed. Furthermore, the image processing unit 206 executes predetermined calculation processing using captured image data, and based on a result of calculation, executes auto while balance (AWB) processing of the TTL system.

Data output from the A/D conversion unit 205 are written into the memory 208 via the image processing unit 206 and the memory control unit 207, or directly into the memory 208 via the memory control unit 207. The memory control unit 207 controls write/read of data into/from the memory 208 via the memory bus 228. Specifically, the memory control unit 207 writes data that is input from the A/D conversion unit 205 and from the image processing unit 206 into the memory 208, and inputs data read from the memory 208 into the image processing unit 206. The memory control unit 207 inputs image data read from the memory 208 into the D/A conversion unit 209.

The memory 208 stores image data obtained from the imaging unit 204, image data to be displayed on the display unit 101, or the like. The memory 208 has storage capacity sufficient for storing a predetermined number of still images and predetermined length of time of moving images and sound, and also serves as a memory (video memory) for image display. The D/A conversion unit 209 converts data for image display, input from the memory control unit 207 and stored in the memory 208, from a digital signal into an analog signal and supplies the signal to the display unit 101. With this configuration, the image data for image display written into the memory 208 is displayed on the display unit 101 via the D/A conversion unit 209.

The display unit 101 performs display to a display section such as a liquid-crystal display according to the analog signal that is output from the D/A conversion unit 209. The digital signal converted by the A/D conversion unit 205 and stored in the memory 208 is converted into an analog signal by the D/A conversion unit 209, so as to be sequentially transferred to the display unit 101 and displayed on the display unit 101. With this configuration, it is possible to allow the display unit 101 to function as an electronic viewfinder and to perform live view display.

The non-volatile memory 211 is an electrically erasable/recordable memory. Exemplary non-volatile memory 211 to be used is EEPROM. The non-volatile memory 211 stores a constant for operation of the system control unit 212, a program, or the like.

The system control unit 212 controls entire portion of the digital camera 100. By executing the program stored in the non-volatile memory 211, the system control unit 212 implements each of processes of the present embodiment to be described below. The system control unit 212 performs display control by controlling the memory 208, the D/A conversion unit 209, the display unit 101, or the like.

The system control unit 212 is a multi-core processor equipped with a plurality of central processing units (CPU). The system control unit 212 includes a control unit, a switching unit, a first core 214, namely a first CPU, and a second core 215, namely, a second CPU. In the present embodiment, the first core 214 activates an RTOS, namely, a first operating system, and the second core 215 activates a general-purpose OS, namely, a second operating system.

The RTOS has a function of estimating required processing time and a mechanism for completing, within a target time, a plurality of processing requests even when generated at a same time. The RTOS, thus, executes processing that requires real time processing in control of the digital camera 100. In contrast, although it is not ensured that the general-purpose OS completes required processing within a target time, the general-purpose OS has a library including a graphical user interface (GUI), so as to implement applications efficiently. The general-purpose OS is activated later than the RTOS. After the power to the digital camera 100 is turned on, the RTOS is activated first, and thereafter the general-purpose OS is activated.

As the system memory 213, RAM is employed. The system memory 213 is used to expand constants and variables for operation of the system control unit 212, programs read from the non-volatile memory 211, or the like. The system timer 216 is a clocking unit that measures a time in various types of control and a time of an internal clock time.

Each of the controller wheel 113, the mode selection switch 112, the first shutter switch 218, the second shutter switch 219, and the operation unit 102 is used for inputting various operation instructions into the system control unit 212.

The mode selection switch 112 switches an operation mode of the system control unit 212 to any of a still image capturing mode, a moving image capturing mode, and a reproduction mode. The still image capturing mode includes an automatic imaging mode, an automatic scene determination mode, a manual mode, various scene modes, namely, imaging setting for each of imaging scenes, a program AE mode, and a custom mode. The mode selection switch 112 is used to switch to any of these modes included in the still image capturing mode. It is possible to configure such that the mode is first switched to the still image capturing mode using the mode selection switch 112, and thereafter the mode is switched to any of these modes included in the still image capturing mode by using another operation section of the operation unit 102. Meanwhile, the moving image capturing mode may include a plurality of modes.

During operation of the shutter button 111 provided on the digital camera 100, the first shutter switch 218 is turned on by half-pressing (imaging preparation instruction) of the shutter button 111 and outputs a first shutter switch signal SW1. In response to the first shutter switch signal SW1, the system control unit 212 starts operation of the auto focus (AF) processing, the automatic exposure (AE) processing, the auto while balance (AWB) processing, the flash pre-emission (EF) processing, or the like.

During operation of the shutter button 111, the second shutter switch 219 is turned on by full-pressing (imaging instruction) of the shutter button 111 and outputs a second shutter switch signal SW2. In response to the received second shutter switch signal SW2, the system control unit 212 executes imaging processing. The imaging processing represents a series of processing including reading a signal from the imaging unit 204, performing digital conversion of the signal by the A/D conversion unit 205, executing image processing by the image processing unit 206, writing image data into the memory 208, displaying the image data on the display unit 101, and writing the image data into the storage medium 123.

Each of operation sections of the operation unit 102 serves as a function button to which a function for each scene is allocated appropriately by performing selection operation of various types of function icons displayed on the display unit 101. Examples of the function button include a finish button, a back button, an image feed button, a jump button, a narrow-down button, and attribute change button. When a menu button is pressed, for example, a menu screen is displayed on the display unit 101. On the menu screen, various types of setting are available. A user can perform various types of setting intuitively by using the menu screen displayed on the display unit 101, the four-way button 114 for up, down, left, and right directions, and the determination button 115.

With rotational operation of the controller wheel 113, an electrical pulse signal is output according to the amount of operation of the controller wheel 113. Based on this pulse signal, the system control unit 212 controls each of portions of the digital camera 100. According to the pulse signal, the system control unit 212 can obtain an angle of rotational operation, a rotation speed, or the like, of the controller wheel 113. The controller wheel 113 may be formed of any operation member as long as it allows rotational operation to be detected. For example, the controller wheel 113 may be formed of a dial operation member configured to operate rotationally in response to the rotational operation performed by the user so as to generate a pulse signal. Alternatively, the controller wheel 113 may be formed of an operation member that includes a touch sensor. Specifically, the controller wheel 113 may be a touch wheel. In this case, the controller wheel 113 does not rotate. Instead, the touch wheel detects a position, direction, or the like, of a user's finger moving together with the controller wheel 113 while the user's finger is in contact with the controller wheel 113.

The power supply unit 222 includes a primary battery such as an alkaline battery and a lithium battery, a secondary battery such as a NiCd battery, a NiMH battery, and a Li-ion battery, and an AC adaptor. The power supply control unit 223 is electrically connected with the power supply unit 222 and includes a battery detection circuit (not illustrated), a DC-DC converter (not illustrated), and a switching circuit to switch blocks to be energized (not illustrated). The power supply control unit 223 detects presence/absence of attachment of battery, a battery type, and a battery remaining amount. Based on a result of detection and on an instruction signal issued from the system control unit 212, the power supply control unit 223 controls the DC-DC converter and supplies a required level of voltage for a required period to each of portions including a storage medium 229.

When the power switch 103 is pressed, the power switch 103 transmits to the system control unit 212 a signal indicating the power switch 103 is pressed. In a case where power is not supplied to each of portions of the digital camera 100 when the power switch 103 is pressed, the system control unit 212 transmits to the power supply control unit 223 an instruction signal to supply power to each of the portions. In a case where power is supplied to each of portions of the digital camera 100 when the power switch 103 is pressed, the system control unit 212 transmits to the power supply control unit 223 an instruction signal to stop power supply to each of the portions.

The attitude detection unit 225 detects an attitude of the digital camera 100 with respect to the direction of gravity. Based on the attitude detected by the attitude detection unit 225, it is possible to determine whether an image captured by the imaging unit 204 is taken while the digital camera 100 is held horizontally or held vertically. The system control unit 212 is capable of adding direction information according to the attitude detected by the attitude detection unit 225 to an image file of the images captured by the imaging unit 204, and capable of storing the image in a rotated state according to the direction information. As the attitude detection unit 225, it is possible to use, for example, an acceleration sensor and a gyrosensor.

The communication unit 226 is connected wirelessly or via a wired cable and transmits/receives an image signal and an audio signal, or the like. The communication unit 226 can be connected to a wireless local area network (LAN) and the Internet. The communication unit 226 can transmit an image (including a live view image) captured with the imaging unit 204, an image stored in the storage medium 229, or the like. The communication unit 226 can receive image data and a variety of other information from external devices.

The storage medium I/F 227 is an interface with the storage medium 123 such as a memory card and a hard disk. When imaging is performed, based on an instruction signal from the system control unit 212, the storage medium I/F 227 reads the captured image data stored in the memory 208 and stores the image data in the storage medium 123. The storage medium 123 represents a storage medium such as a memory card for storing a captured image and includes a semiconductor memory and a magnetic disk. Each of the memory control unit 207, the memory 208, the system control unit 212, and the storage medium I/F 227 is connected with the memory bus 228. The memory bus 228 adjusts memory access requirements from each of portions and performs control so as to achieve time-division reading and writing to the memory 208.

Figure 3:
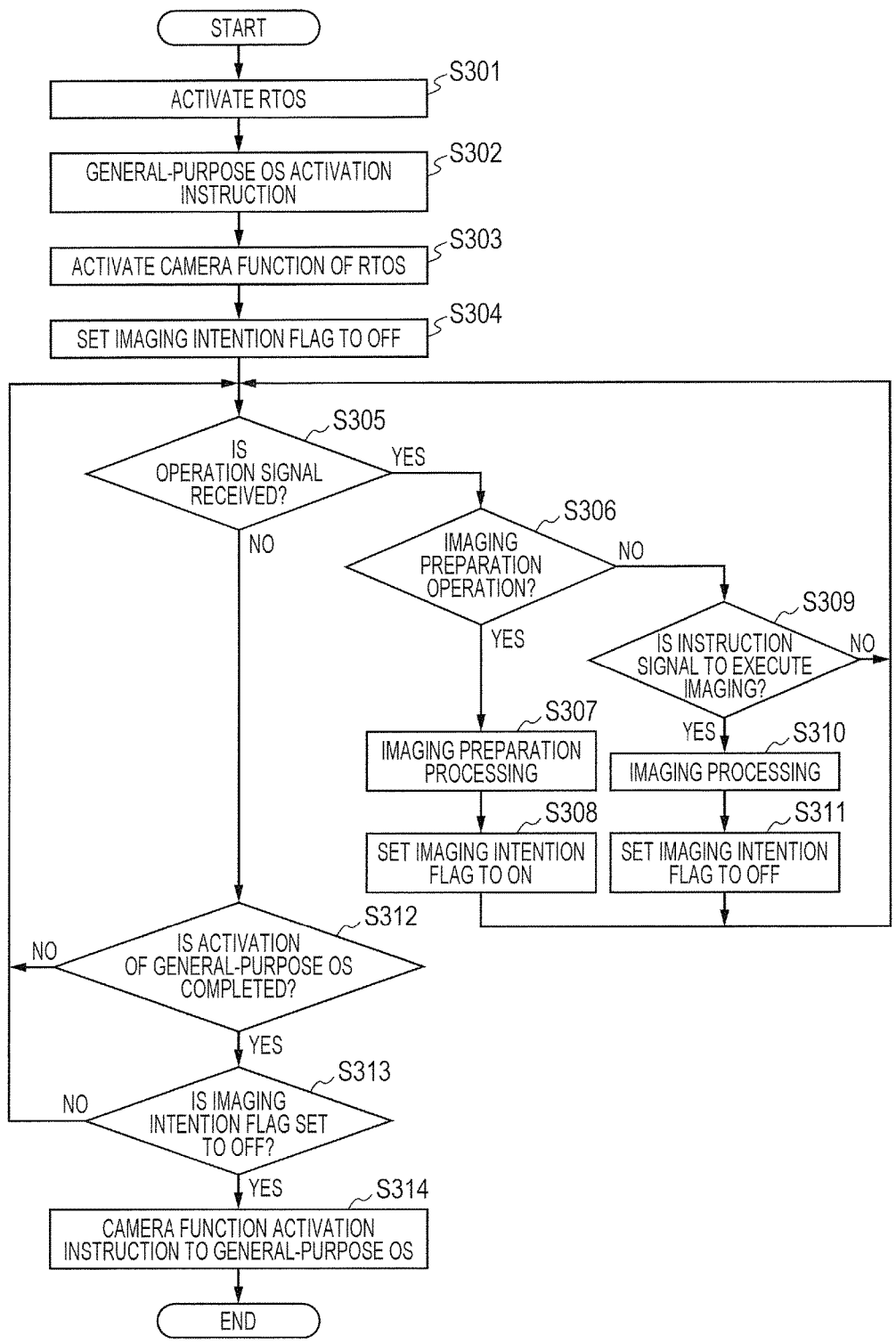
FIG. 3 is a flowchart illustrating OS camera function switching processing according to the first embodiment of the present invention.

FIG. 3 is a flowchart illustrating OS switching processing according to the present embodiment.

A flowchart illustrated in FIG. 3 is a flowchart indicating an imaging mode immediately after the power to the digital camera 100 is turned on. In other words, processing of the present flowchart is started in response to reception of an operation signal of the power switch 103 by the system control unit 212. The present flowchart illustrates a case in which, in the event that various types of operation are in progress for execution of imaging processing on the RTOS during the period until completion of activation of the general-purpose OS, switching to the camera function of the general-purpose OS is not performed until the imaging processing is completed. The flowchart illustrated in FIG. 3 indicates processing executed by the first core 214.

In step S301, the first core 214 activates the RTOS in response to turning on the power and thereinafter operates according to the RTOS. In step S302, the first core 214 transmits to the second core 215 an instruction signal to instruct activation of the general-purpose OS. The second core 215 receives the instruction signal from the first core 214, and thereafter, starts activation of the general-purpose OS. After completion of activation of the general-purpose OS, the second core 215 transmits to the first core 214 a notice that activation of the general-purpose OS is completed. Note that it is possible to configure such that the second core 215 activates the general-purpose OS in response to turning on the power, similarly to the case of the first core 214. In this case, it is possible to omit transmission processing of the instruction signal in step S302.

In step S303, the first core 214 allows the camera function to operate on the RTOS, namely, starts control of each of portions on the digital camera 100 according to a program that corresponds to the camera function of the RTOS. In step S304, the first core 214 initializes setting of an imaging intention flag to OFF. The imaging intention flag represents a flag indicating that there is a possibility that imaging processing by the digital camera 100 is going to be executed.

In step S305, the first core 214 monitors whether there is any operation on the digital camera 100. Specifically, the first core 214 determines whether an operation signal indicating that the user operates the digital camera 100 is received. If the operation signal is received (step S305: Yes), the first core 214 determines that there is operation on the digital camera 100 and moves on to step S306. In a case where no operation signal is received (step S305: No), the first core 214 determines that there is no operation on the digital camera 100 and moves on to step S312.

In step S306, the first core 214 determines whether the received operation signal is an operation signal for the operation related to imaging preparation. The operation related to imaging preparation represents operation related to imaging preparation to be performed prior to imaging, including changes in various imaging parameters, zooming operation AF, AE, or the like, performed by operation on the operation unit 102. In a case where the received operation signal is an operation signal for operation related to imaging preparation (step S306: Yes), the first core 214 determines that imaging preparation of the digital camera 100 is in progress and moves on to step S307. In a case where the received operation signal is not an operation signal for operation related to imaging preparation (step S306: No), the first core 214 determines that imaging preparation of the digital camera 100 is not in progress and moves on to step S309.

In step S307, the first core 214 executes processing related to imaging preparation. The processing related to imaging preparation means processing to be executed by the first core 214, that is, processing of controlling each of portions according to, for example, imaging parameter change and zooming operation based on the operation signal received in step S306. In step S308, the first core 214 sets the imaging intention flag to ON, stores information that there is a possibility that imaging processing is going to be executed in a subsequent process, and returns to step S305.

In step S309, the first core 214 determines whether the operation signal is an instruction signal to execute imaging. In a case where the signal is the instruction signal to execute imaging (step S309: Yes), the first core 214 determines that imaging processing that corresponds to the imaging preparation is executed and moves on to step S310. In a case where the signal is not the instruction signal to execute imaging, (step S309: No), the first core 214 determines that imaging processing is not executed and returns to step S305. In step S310, the first core 214 executes imaging processing. Imaging processing is executed using a camera function by control of the RTOS, and thus, in step S311, the first core 214 sets the imaging intention flag to OFF and returns to step S305. The state that the imaging processing is executed means, as described above, that image data is generated and written into the memory 208 by the imaging unit 204, the A/D conversion unit 205, and the image processing unit 206.

In step S312, the first core 214 determines whether a notice to indicate completion of activation of the general-purpose OS is received from the second core 215. In a case where the notice is received from the second core 215 (step S312: Yes), the first core 214 determines that activation of the general-purpose OS is completed in the second core 215 and moves on to step S313. In a case where the notice is not received from the second core 215 (step S312: No), the first core 214 determines that activation of the general-purpose OS is not completed in the second core 215 and returns to step S305, awaiting the user's input.

In step S313, the first core 214 determines whether the imaging intention flag is set to OFF. In a case where the imaging intention flag is set to OFF (step S313: Yes), the first core 214 determines that there is no possibility that imaging processing is going to be executed on the RTOS and moves on to step S314. In a case where the imaging intention flag is set to ON (step S313: No), the first core 214 determines that there is a possibility that imaging processing is going to be executed on the RTOS and returns to step S305, awaiting the user's input. With this configuration, switching to the camera function of the general-purpose OS is not going to be performed while the digital camera 100 is operating using the camera function of the RTOS and the user is performing imaging operation. Accordingly, it is possible for the user to continue imaging operation using the camera function of the RTOS without interruption.

In step S314, the first core 214 transmits to the second core 215 an instruction signal to instruct activation of the camera function on the general-purpose OS. After receiving the instruction signal from the first core 214, the second core 215 reads a program to control the camera function from the non-volatile memory 211 and executes the program. With this processing, subsequent operation processing related to imaging executed by the user on the digital camera 100, namely, control of each of portions of the camera function, processing of signal that is input into the system control unit 212, or the like, is going to be executed by the general-purpose OS. Note that, when the first core 214 transmits the instruction signal or activates the camera function of the general-purpose OS in step S314, the first core 214 finishes the RTOS or the camera function of the RTOS. The camera function of the RTOS is less sophisticated than the camera function of the general-purpose OS. For example, there are restrictions in the camera function of the RTOS such as unavailability of consecutive imaging, or even if it is possible, less number of capturable images in consecutive imaging than with the camera function of the general-purpose OS, difficulty in face recognition processing, particularly difficulty in processing of automatically adjusting a focal position to a face. Therefore, by switching from the camera function of the RTOS to the camera function of the general-purpose OS, it is possible for the user to use more sophisticated camera functions. Meanwhile, by using the camera function of the RTOS, it is possible for the user to catch a right moment to capture an image that is possibly generated during a waiting time until the general-purpose OS is activated.

In this manner, in the present embodiment, in a case where the operation signal of imaging preparation is input on the RTOS, the RTOS executes processing of operation signal of imaging including the operation signal. Subsequently, in a case no operation signal of imaging preparation is input on the RTOS, switching is performed after activation of the general-purpose OS such that processing of the operation signal related to imaging is to be executed on the general-purpose OS. With this configuration, switching to the camera function of the general-purpose OS is not going to be performed in a case where there is a possibility that imaging processing is going to be executed on the RTOS. Accordingly, it is possible to execute imaging processing without interfering with continuity of operation related to imaging of the user even at a time immediately after the power to the digital camera 100 is turned on.

Second Embodiment

In the present embodiment, in contrast to the first embodiment, a button for switching to the camera function of the general-purpose OS is allocated on the operation unit 102, and switching of the camera function of the RTOS to the camera function of the general-purpose OS is performed by operation of the button. This is a unique feature in the configuration in the second embodiment that differs from the first embodiment. Other configurations, however, are common to the first and second embodiments. Accordingly, description on common configurations will be omitted.

The system control unit 212 allocates a button to be used for switching to the camera function of the general-purpose OS to any one button, for example, a button 115 or a button 116 on the operation unit 102 of the digital camera 100. It is also possible to configure such that, by using a touch panel as the display unit 101, for example, the system control unit 212 displays a button for switching to the camera function of the general-purpose OS as image data and that switching to the camera function of the general-purpose OS would be performed by user's operation of the button.

Figure 4:
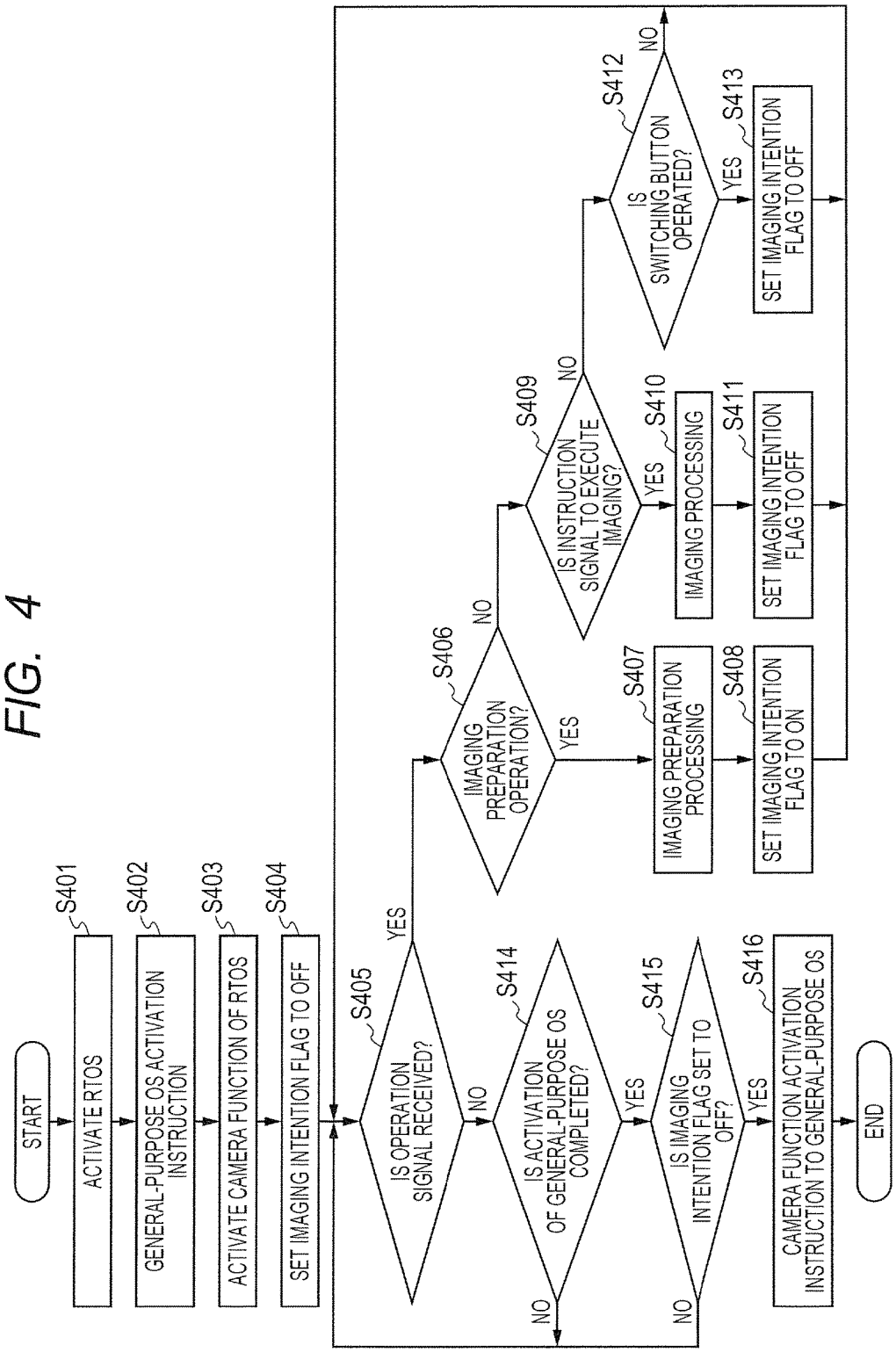
FIG. 4 is a flowchart illustrating OS camera function switching processing according to a second embodiment of the present invention.

FIG. 4 is a flowchart illustrating OS camera function switching processing according to the second embodiment of the present invention. Based on the present flowchart, processing to be executed after operation of a switching button for switching to the camera function of the general-purpose OS will be described. Steps S401 to S408 and steps S410 and S411 include similar processing as in step S301 to S308 and in S310 and S311 of the first embodiment. Steps S414 to S416 include similar processing as in steps S312 to 314 in the first embodiment. Accordingly, description on the steps including common processing will be omitted.

In step S409, the first core 214 determines whether the operation signal is an instruction signal to execute imaging. In a case where the signal is the instruction signal to execute imaging, (step S409: Yes), the first core 214 determines that imaging processing is executed and moves on to step S410. In a case where the signal is not the instruction signal to execute imaging, (step S409: No), the first core 214 determines that imaging processing is not executed and moves on to step S412. In step S410, the first core 214 executes imaging processing. Imaging processing is executed using a camera function by control of the RTOS, and thus, in step S411, the first core 214 sets the imaging intention flag to OFF and returns to step S405.

In step S412, the first core 214 determines whether an operation signal of the switching button allocated for switching to the camera function of the general-purpose OS is received. In a case the operation signal of the button is received (step S412: Yes), the first core 214 determines that imaging using the camera function of the RTOS are not going to be performed and moves on to step S413. In a case the operation signal of the button is not received (step S412: No), the first core 214 determines that it is possible that imaging using the camera function of the RTOS is going to be performed and returns to step S405. In step S413, the first core 214 sets the imaging intention flag to OFF and returns to step S405.

In this manner, in the present embodiment, a button for switching to the camera function of the general-purpose OS is allocated, and the camera function of the RTOS is switched to the camera function of the general-purpose OS based on the operation signal of the button. With this configuration, even when operation related to imaging preparation is performed on the RTOS, it is possible, just by pressing a button configured to switch to the camera function of the general-purpose OS, to switch to the camera function of the general-purpose OS at a timing desirable for the user without interfering with user's operation related to imaging.

Third Embodiment

The present embodiment differs from the first embodiment in that, in a case where activation of the general-purpose OS is completed while imaging preparation operation is performed, the camera function of the general-purpose OS is automatically activated when no operation is detected for a predetermined time. The other configurations are common in the first and third embodiments. Accordingly, description on common configurations will be omitted.

Figure 5:
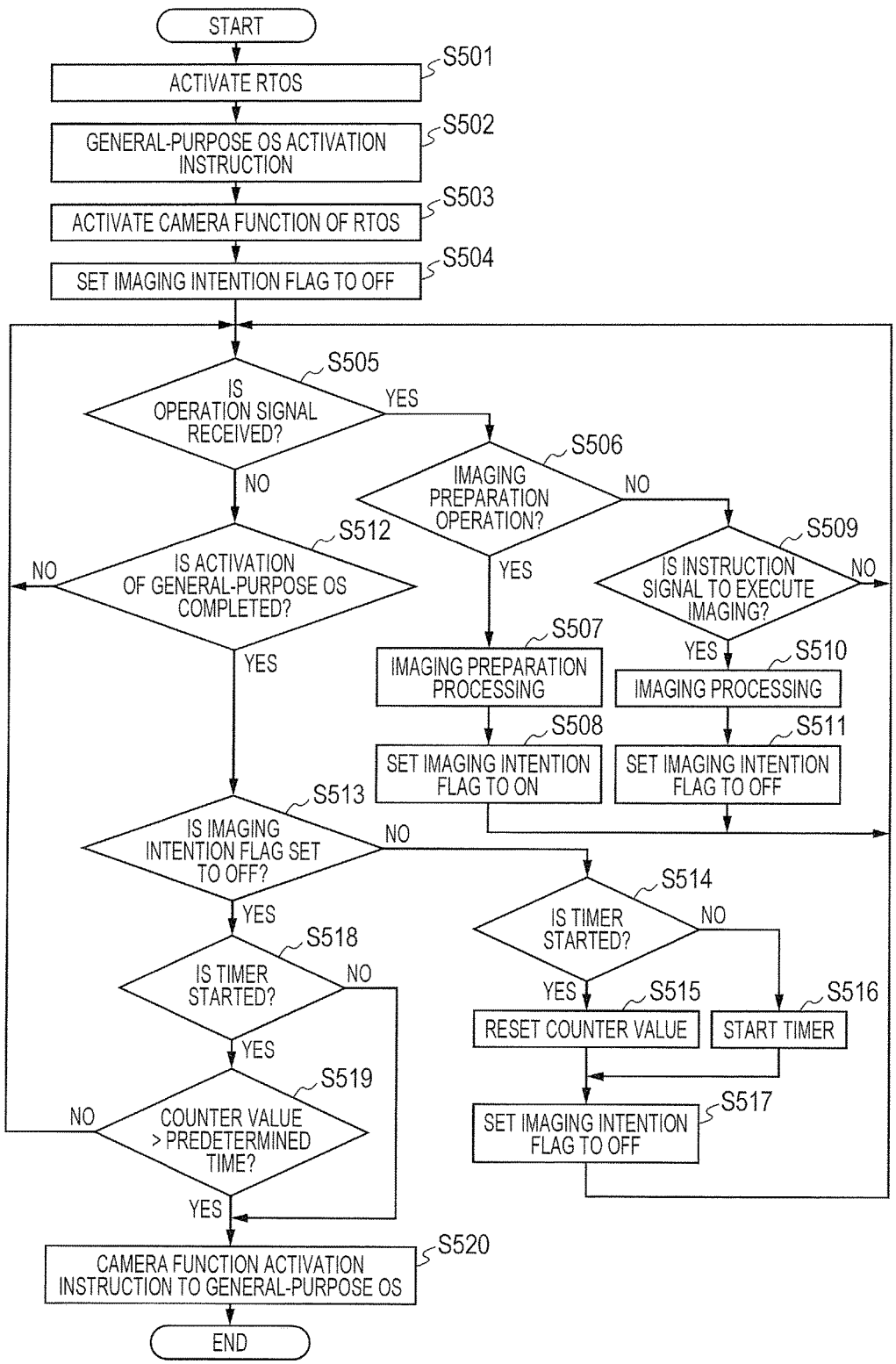
FIG. 5 is a flowchart illustrating OS camera function switching processing according to a third embodiment of the present invention.

FIG. 5 is a flowchart illustrating OS camera function switching processing according to the present embodiment. Steps S501 to S512 include similar processing as in step S301 to S312 of the first embodiment. Step S520 includes similar processing as in step S314 in the first embodiment. Accordingly, description on the steps including common processing will be omitted.

In step S513, the first core 214 determines whether the imaging intention flag is set to OFF. In a case where the imaging intention flag is set to OFF (step S513: Yes), the first core 214 determines that there is no possibility that imaging processing is going to be executed and moves on to step S518. In a case where the imaging intention flag is set to ON (step S513: No), the first core 214 determines that there is a possibility that imaging processing is going to be performed on the RTOS and moves on to step S514.

In step S514, the first core 214 determines whether the system timer 216, which counts the time that elapsed after activation of the general-purpose OS, is started. In a case where the system timer 216 is started, (step S514: Yes), the first core 214 determines that imaging preparation operation is performed after the start of the system timer 216 and moves on to step S515. In a case where the system timer 216 is not started (step S514: No), the first core 214 determines that counting of the elapsed time from the completion of activation of the general-purpose OS is not started and moves on to step S516. In step S515, the first core 214 resets a counter value of the system timer 216 and continues counting. In step S516, the first core 214 starts counting on the system timer 216. In step S517, the first core 214 sets the imaging intention flag to OFF and returns to step S505.

In step S518, the first core 214 determines whether the system timer 216 is started. In a case where the system timer 216 is started (step S518: Yes), the first core 214 determines that operation related to imaging preparation is performed and moves on to step S519. In a case where the system timer 216 is not started (step S518: No), the first core 214 determines, from the fact that the system timer 216 is not started, that operation related to imaging preparation is not performed and moves on to step S520.

In step S519, the first core 214 determines whether the count value of the system timer 216 exceeds the predetermined time. In a case where the count value of the system timer 216 exceeds the predetermined time (step S519: Yes), the first core 214 determines that the predetermined time elapses after activation of the general-purpose OS and moves on to step S520. In a case where the count value of the system timer 216 does not exceed the predetermined time (step S519: No), the first core 214 determines that the predetermined time does not elapse after activation of the general-purpose OS, returns to step S505, and monitors whether operation is not performed until the predetermined time elapses.

In this manner, in the present embodiment, in a case where activation of the general-purpose OS is completed while the imaging intention flag is set to ON, in the event that the imaging preparation operation is not performed for a predetermined time, the camera function of the RTOS is automatically switched to the camera function of the general-purpose OS. With this configuration, in a case where operation related to imaging preparation is performed in a period until the predetermined time elapses, the counter value of the system timer 216 is reset. Accordingly, the user can continue imaging processing using the camera function of the RTOS provided it is within the predetermined time.

The embodiments of the present invention have been described as above. Note that the present invention is not limited to the above-described embodiments but various modifications are possible without departing from the scope and spirit of this invention. For example, application to the digital camera 100 has been described in the above-described embodiments, although the present invention is applicable not only to digital cameras but also to a variety of imaging apparatuses. Moreover, in the above-described second embodiment, switching to the general-purpose OS is performed in response to operation of the switching button for switching to the camera function of the general-purpose OS, although it is possible to configure such that the switching button for switching to the camera function of the general-purpose OS is displayed on the display unit 101 after completion of activation of the general-purpose OS.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-066822, filed Mar. 27, 2015, which is hereby incorporated by reference herein in its entirety.

What is claimed is:

1. An imaging apparatus including a plurality of operating systems and executing imaging processing according to a camera function that operates on each of the plurality of operating systems, the imaging apparatus comprising:
   a reception unit configured to receive input of an operation signal of imaging preparation according to a first camera function of a first operating system, activation of the first operating system being completed prior to activation of a second operating system; and
   a control unit configured to
      execute a second camera function of the second operating system instead of the first camera function in an event that the first camera function is not executing imaging preparation processing when activation of the second operating system is completed, and
      continue execution of the first camera function without starting execution of the second camera function in an event that the first camera function is executing imaging preparation processing when the activation of the second operating system is completed.

2. The imaging apparatus according to claim 1, wherein the control unit is configured to finish execution of the first operating system or execution of the first camera function in the event that the first camera function is not executing imaging preparation processing when the activation of the second operating system is completed.

3. The imaging apparatus according to claim 1, wherein, the control unit is configured to execute the second camera function instead of the first camera function in an event that the first camera function is executing imaging preparation processing when the activation of the second operating system is completed and imaging processing by the first camera function is to finish after completion of activation of the second operating system.

4. The imaging apparatus according to claim 1, wherein, the control unit is configured to execute the second camera function instead of the first camera function in the event that the first camera function is executing imaging preparation processing when the activation of the second operating system is completed and an operation signal to the first camera function is not input for a predetermined time.

5. A control method for controlling an imaging apparatus including a plurality of operating systems and configured to execute imaging processing according to a camera function that operates on each of the operating systems, the control method comprising:
   completing activation of one operating system prior to activation of other operating system and receiving input of an operation signal of imaging preparation according to a first camera function;
   executing a camera function of another operating system instead of the first camera function in the event that the first camera function is not executing imaging preparation processing at the time of completion of activation of the other operating system; and
   continuing execution of the first camera function without starting execution of the camera function of the other operating system in the event that the first camera function is executing imaging preparation processing at the time of completion of activation of the other operating system.

6. A non-transitory computer readable storage medium storing a program that causes a computer that implements an imaging apparatus having a plurality of operating systems and configured to execute imaging processing according to a camera function that operates on each of the operating systems to execute:
   completing activation of one operating system prior to activation of other operating system and receiving input of an operation signal of imaging preparation according to a first camera function;
   executing a camera function of another operating system instead of the first camera function in the event that the first camera function is not executing imaging preparation processing at the time of completion of activation of the other operating system; and
   continuing execution of the first camera function without starting execution of the camera function of the other operating system in the event that the first camera function is executing imaging preparation processing at the time of completion of activation of the other operating system.

* * * * *